E. RUEGAMER.
STEERING GEAR.
APPLICATION FILED JULY 16, 1915.
1,179,965.
Patented Apr. 18, 1916.
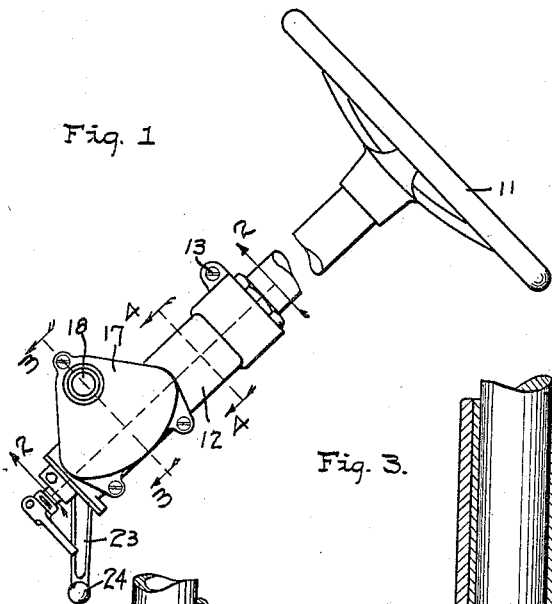
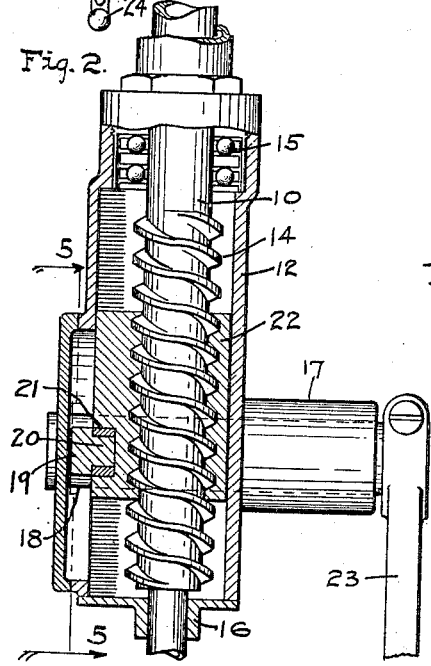
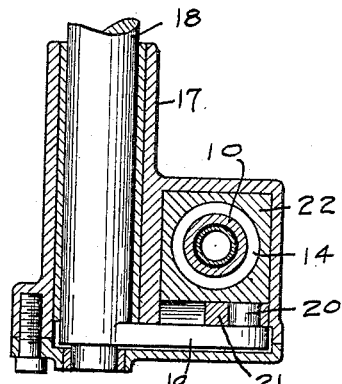
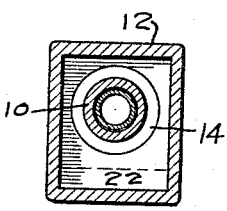
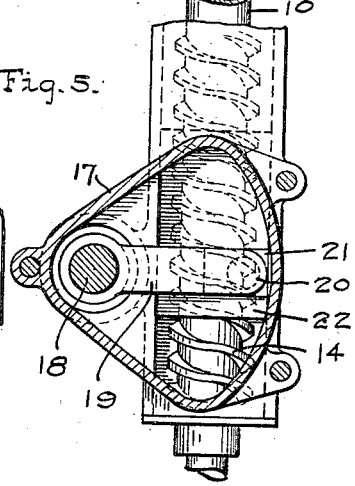
WITNESSES:
J. H. Swan.
J. H. Wells.
INVENTOR
ELMER RUEGAMER
BY
V. H. Lockwood
ATTORNEY

UNITED STATES PATENT OFFICE.

ELMER RUEGAMER, OF LA FAYETTE, INDIANA.

STEERING-GEAR.

1,179,965.  Specification of Letters Patent.  Patented Apr. 18, 1916.

Application filed July 16, 1915. Serial No. 40,246.

*To all whom it may concern:*

Be it known that I, ELMER RUEGAMER, a citizen of the United States, and a resident of La Fayette, county of Tippecanoe, and State of Indiana, have invented a certain new and useful Steering-Gear; and I do hereby declare that the following is a full, clear, and exact description thereof, reference being had to the accompanying drawings, in which like letters refer to like parts.

This invention relates to a steering gear for automobiles, trucks, and the like. Its object is to provide a more substantial and strong steering device and one which is less likely to give way under strain or get out of order.

A further object of the invention is to provide a steering gear of comparatively few parts and of simple construction, which will reduce the cost of producing a strong and substantial gear.

The full nature of the invention will be understood from the accompanying drawings and the following description and claims.

In the drawings Figure 1 is a side elevation of the steering gear, post, and wheel. Fig. 2 is a cross section on the line 2—2 of Fig. 1. Fig. 3 is a section on the line 3—3 of Fig. 1. Fig. 4 is a cross section on the line 4—4 of Fig. 1. Fig. 5 is a cross section on the line 5—5 of Fig. 2.

In the drawings there is shown a steering shaft 10 having a steering wheel 11, extending through a housing 12 which is rigidly secured to the body of an automobile or the like at 13.

On the shaft, and incased therein, there are worm threads 14. The shaft rides in said housing on ball bearings 15 in the upper end thereof, and on a bearing 16 in the lower end. There is a block 22 surrounding the shaft so as to engage the worm threads therein and be actuated up and down within the housing and slidable therein.

Secured to the housing 12 there is a fan shaped housing 17 having an extension through which the shaft 18 extends at right angles to said worm gear. From one end of the shaft 15 there extends an arm 19 having a pin 20 adapted to turn in a sliding block 21. Said block 21 rides in a groove in said block 22, so that it will be operated by said block when the steering wheel is turned.

On the lower end of the shaft 18 there is secured a reach arm 23 having a ball 24 adapted to connect said reach arm to the steering knuckle of the automobile.

The operation of the device is as follows: When the steering shaft is turned by the steering wheel, the block 22 is raised or lowered, as the case may be, in the housing by means of the worm threads on the shaft, and operates the arm 19 by means of the pin 20 and the block 21 sliding back and forth in the groove of the block 22. This movement of the arm 19 actuates the shaft 18 and in turn the reach arm 23 transmits the movement, through the steering knuckle, to the steering arms on the automobile wheels.

The invention claimed is:

1. A steering gear including a steering shaft, worm threads on said shaft, a block adapted to ride on said worm threads, a slot in one side of said block, a second block slidable in said slot, a reach arm, and means connected to said second mentioned block for operating said reach arm.

2. A steering gear including a steering shaft, worm threads on said shaft, a block adapted to ride on said threads, a slot in one side of said block, a second block adapted to slide in said slot, a reach arm, and a rod having an arm for engaging said second mentioned block by means of which said steering shaft actuates said reach arm.

In witness whereof, I have hereunto affixed my signature in the presence of the witnesses herein named.

ELMER RUEGAMER.

Witnesses:
CLARENCE RUEGAMER,
JOHN A. RUEGAMER.

Copies of this patent may be obtained for five cents each, by addressing the "Commissioner of Patents, Washington, D. C."